(12) United States Patent
Lilland et al.

(10) Patent No.: US 7,349,294 B2
(45) Date of Patent: *Mar. 25, 2008

(54) DISC ERROR CHECKING SENSOR FOR PRINTERS AND DUPLICATORS

(75) Inventors: Kevin R. Lilland, Prior Lake, MN (US); Michael R. Tolrud, Chaska, MN (US); Matthew P. Kaiser, Rockford, MN (US); Brent L. Nordhus, Delano, MN (US)

(73) Assignee: Primera Technology Inc., Plymouth, MN (US)

( * ) Notice: Subject to any disclaimer, the term of this patent is extended or adjusted under 35 U.S.C. 154(b) by 785 days.

This patent is subject to a terminal disclaimer.

(21) Appl. No.: 10/761,087

(22) Filed: Jan. 20, 2004

(65) Prior Publication Data

US 2005/0157605 A1    Jul. 21, 2005

(51) Int. Cl.
*G11B 7/085* (2006.01)

(52) U.S. Cl. ............... 369/30.57; 369/30.42; 369/30.55; 347/171

(58) Field of Classification Search ............. 369/30.57, 369/30.42, 30.55, 30.36; 347/171, 193, 197, 347/222; 400/58.61, 120.01; 700/223
See application file for complete search history.

(56) References Cited

U.S. PATENT DOCUMENTS

| | | | |
|---|---|---|---|
| 5,518,325 A | 5/1996 | Kahle | |
| 5,542,768 A | 8/1996 | Rother et al. | |
| 5,549,444 A | 8/1996 | Dubuit | |
| 5,734,629 A | 3/1998 | Lee et al. | |
| 5,873,692 A | 2/1999 | Costas | |
| 5,910,939 A * | 6/1999 | Shiba et al. | 369/30.57 |
| 5,927,208 A | 7/1999 | Hagstrom et al. | |
| 5,934,865 A | 8/1999 | Meadows | |
| 5,946,216 A * | 8/1999 | Hollerich | 700/223 |
| 6,021,029 A | 2/2000 | Mamiya et al. | |
| 6,111,847 A | 8/2000 | Assadian | |
| 6,141,298 A | 10/2000 | Miller | |
| 6,148,722 A | 11/2000 | Hagstrom | |
| 6,222,800 B1 | 4/2001 | Miller et al. | |
| 6,270,176 B1 | 8/2001 | Kahle | |
| 6,302,601 B1 | 10/2001 | Hagstrom et al. | |
| 6,321,649 B1 | 11/2001 | Vangen et al. | |
| 6,327,230 B1 | 12/2001 | Miller et al. | |

(Continued)

FOREIGN PATENT DOCUMENTS

DE    100 105 21 A1    11/2000

(Continued)

*Primary Examiner*—Ali Neyzari
(74) *Attorney, Agent, or Firm*—Westman, Champlin & Kelly, P.A.

(57) ABSTRACT

A disc processor, such as a printer or a recorder, or a combination processor, has a robotic arm that will pick a compact disc to be processed from a storage stack and move it to a tray associated with the processor. The robotic arm includes a sensor to sense when a disc is in a position to be held in a picker on the arm. The sensor signal can be used for determining whether or not the stack of discs in the input bin is of the correct height; for determining whether or not more than one disc has been picked up by the handler; and also for determining the presence of a disc in the tray or held on the picker arm.

19 Claims, 8 Drawing Sheets

U.S. PATENT DOCUMENTS

| | | |
|---|---|---|
| 6,332,680 B1 | 12/2001 | Ozawa |
| 6,447,181 B1 | 9/2002 | Hagstrom et al. |
| 6,580,444 B1 | 6/2003 | Drynkin et al. |
| 6,760,052 B2 * | 7/2004 | Cummins et al. ........... 347/171 |
| 2003/0222926 A1 | 12/2003 | Cummins et al. |

FOREIGN PATENT DOCUMENTS

| | | |
|---|---|---|
| EP | 079 97 10 A1 | 10/1997 |
| EP | 1 120 785 A1 | 8/2001 |
| JP | 2002056584 | 2/2002 |

* cited by examiner

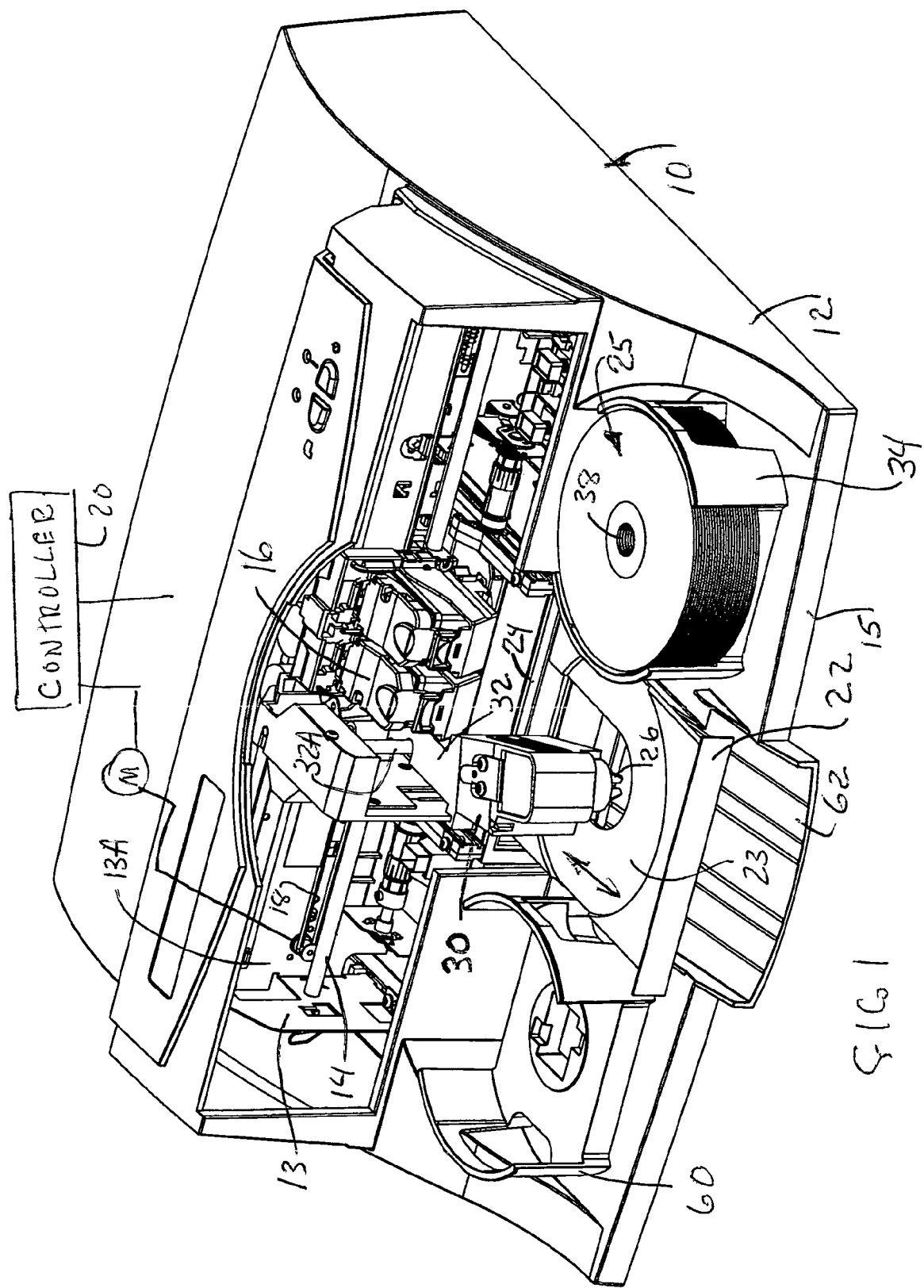

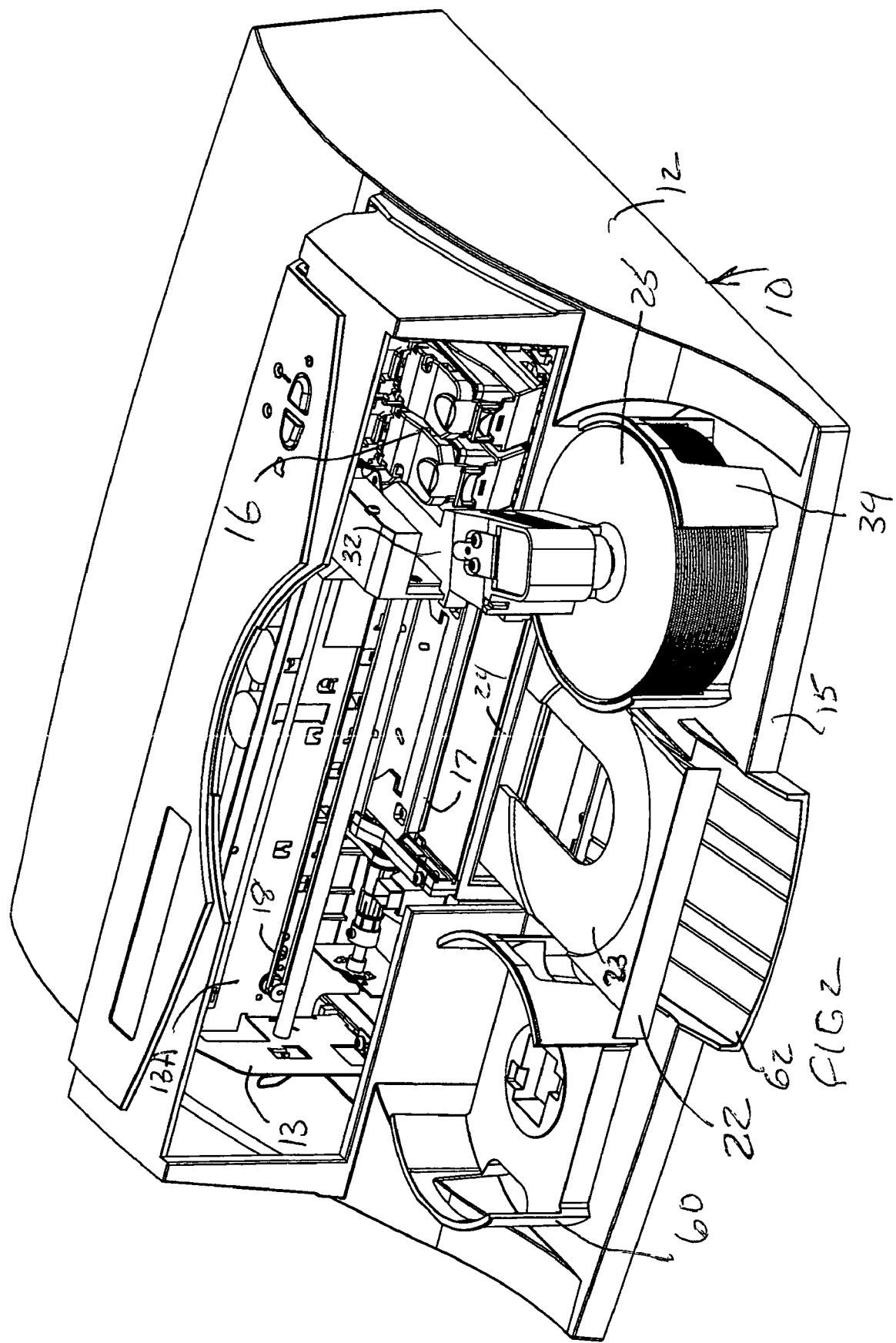

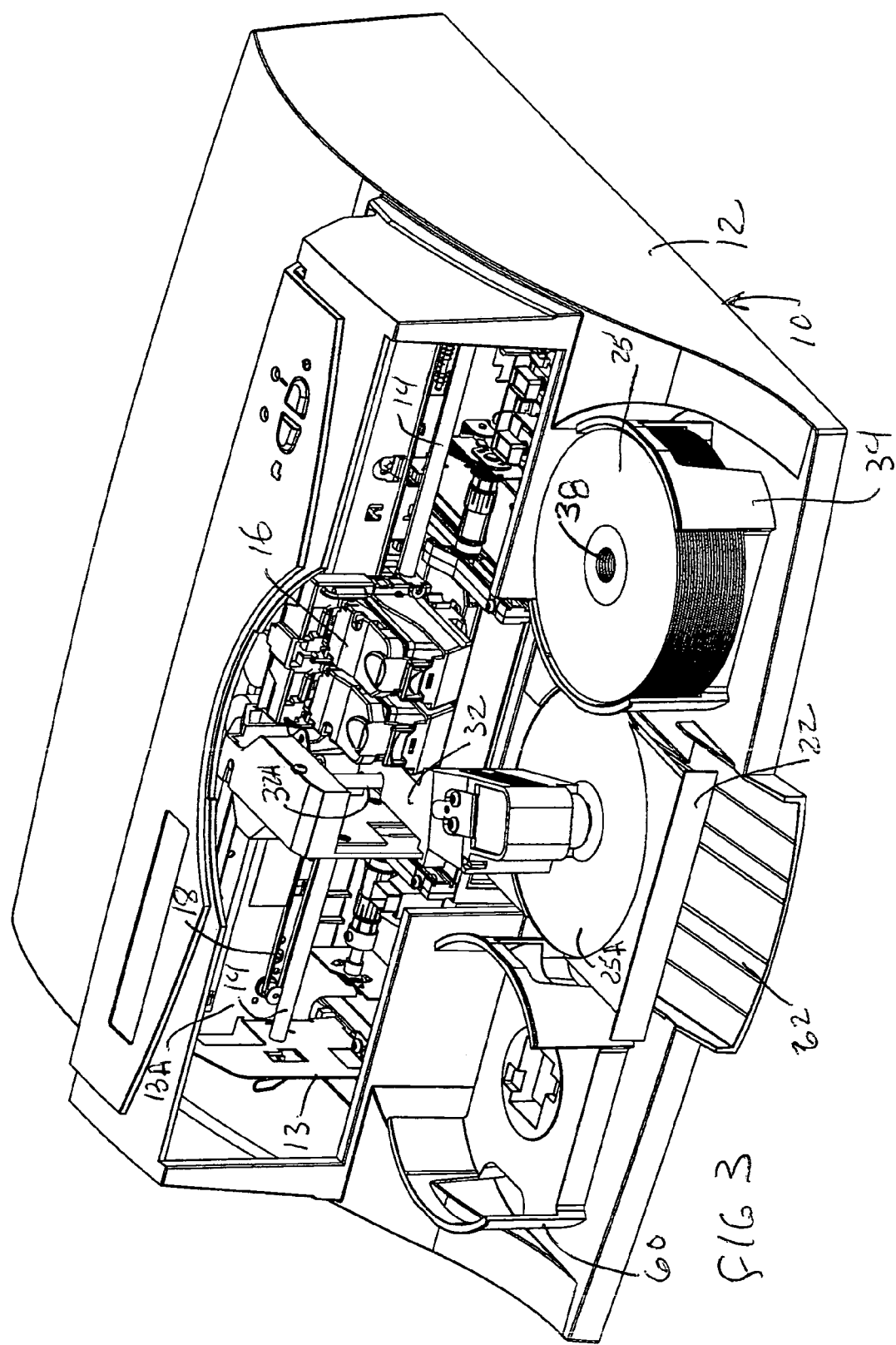

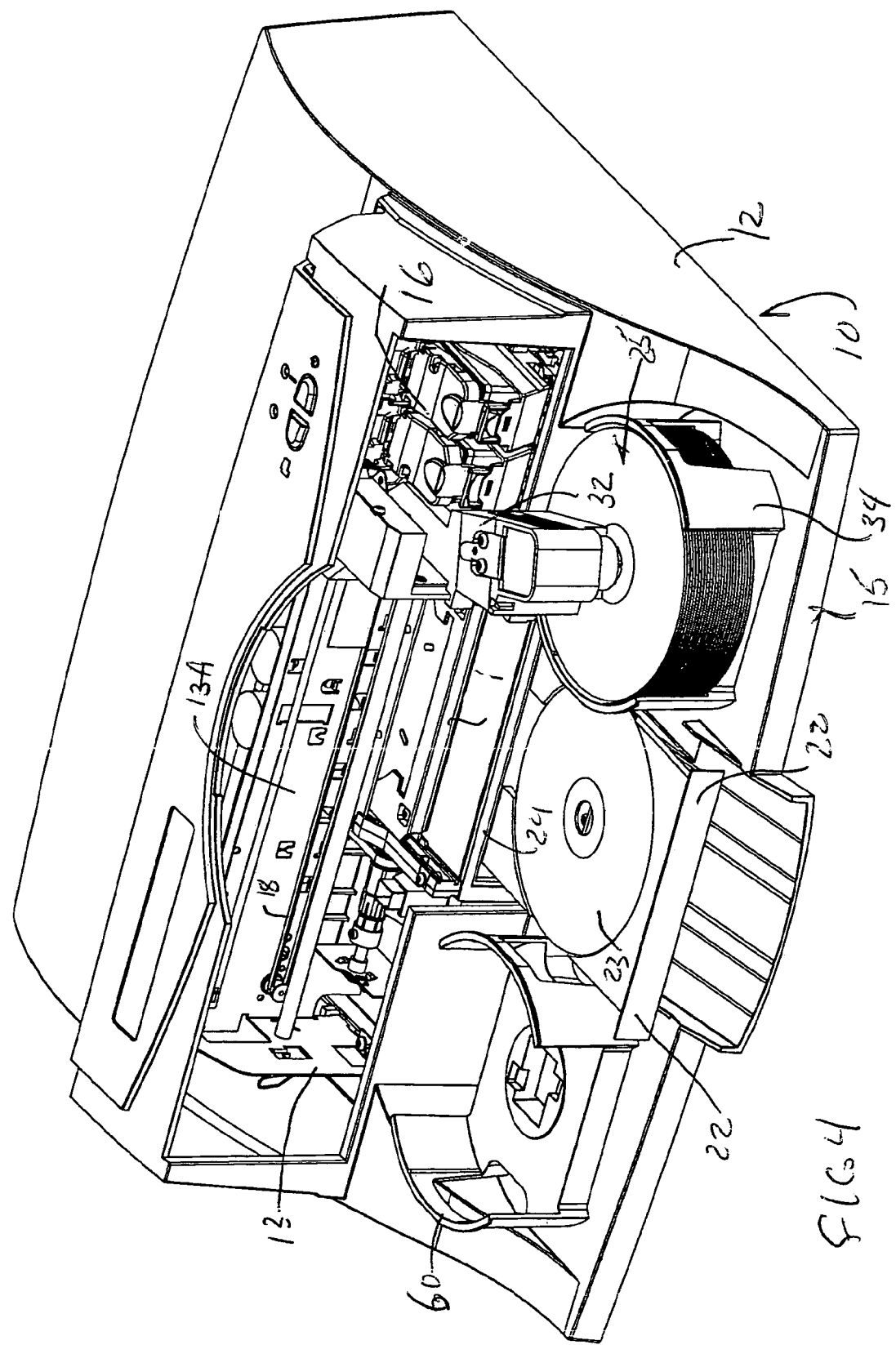

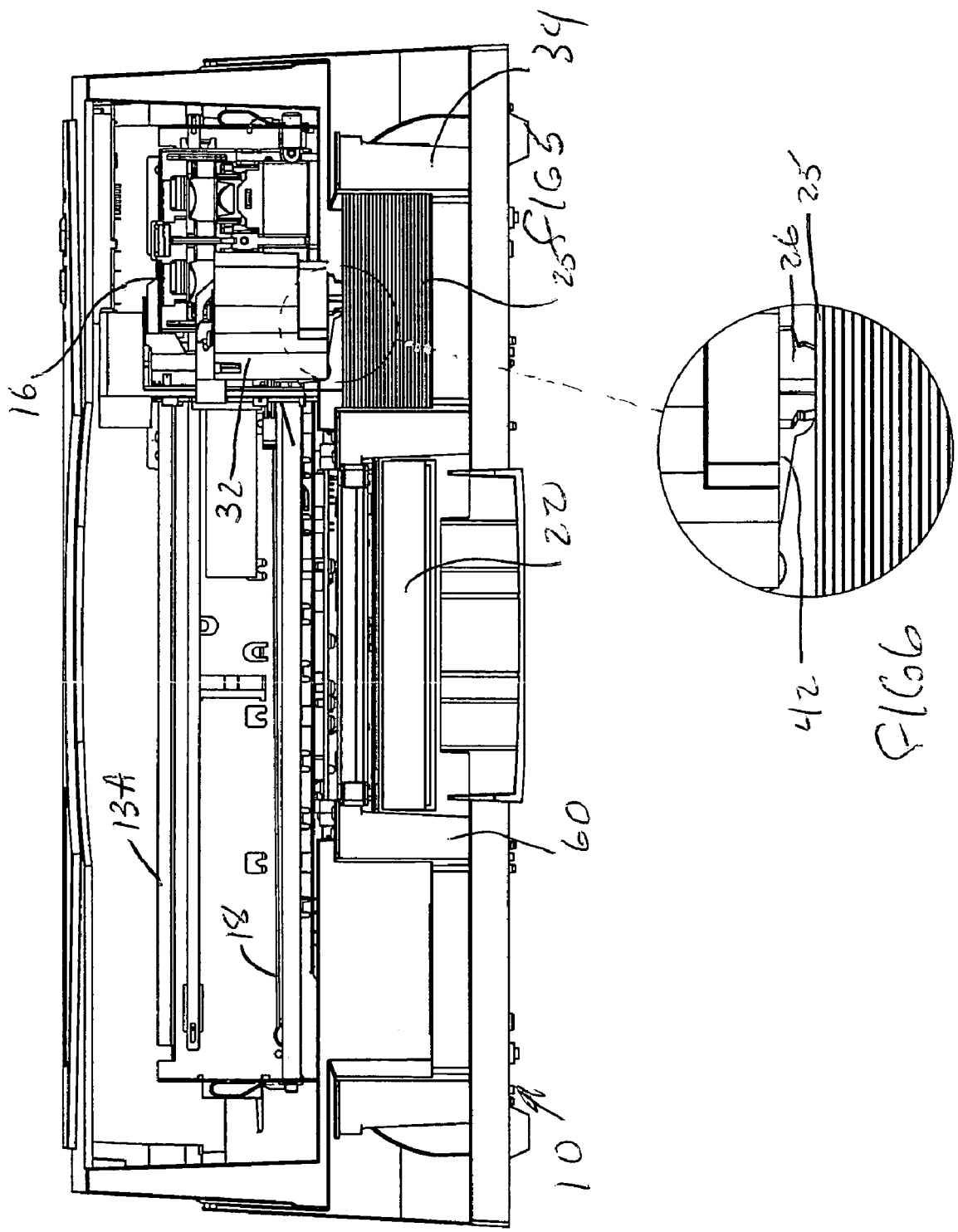

DISC ERROR CHECKING SENSOR FOR PRINTERS AND DUPLICATORS

CROSS-REFERENCE TO RELATED APPLICATION

Reference is made to U.S. patent application Ser. No. 10/447,503, filed May 29, 2003, now U.S. Pat. No. 7,061,515, the content of which is incorporated herein in its entirety.

BACKGROUND OF THE INVENTION

The present invention relates to an automated compact disc processor including a system for checking to insure compact discs are being properly picked and placed in a printer or duplicator forming the processor. The processor may be for printing on or duplicating CDs, CD-ROMs, DVDs and similar compact discs with center holes. A sensor is provided on a robotic picker arm and is used for several disc error conditions. These include: determining whether the recorder tray is empty when commencing a recording sequence; whether only one disc has been picked for processing in each sequence and whether or not the disc that has been processed is properly picked for removal and storage.

Recording digital information on compact discs, including music, video information and the like as well as printing on the disc has been automated, as shown in application Ser. No. 10/447,503. The mechanism that is used for handling the discs is generally very reliable, but occasionally a disc will remain in the process tray that is used for recording or printing (when a previous run was interrupted, for example), and there is a potential for dropping a second disc on top of a disc already in the tray thereby damaging the drive for the tray when two discs are on the tray.

Also, there is a possibility of picking up two discs at a time from the blank disc storage bin. The blank discs are stacked one on top of the other in the bin and sometimes the discs will stick together due to static electricity, or by being pressed together without complete curing of the varnish on the discs.

Finally, another type of error that can occur is when a disc has been processed and the processor disc tray has been extended. In present recorders and duplicators, the disc recorders are standard computer components and are not designed for robotic implementation. Due to this design limitation, the recorder tray will sometimes not extend completely or come out slightly skewed. If the tray is incorrectly positioned, the picker of the robotic arm that is used for picking the discs out of the tray may be unable to engage the opening in the disc and lift the disc from the tray. The present sensor can be used to sense such an occurrence and relay this information to a controller which then resets and retries the unloading, often resulting in a successful pick. These types of errors are capable of being detected with the present invention.

SUMMARY OF THE INVENTION

The present invention is a robotic handler for handling compact discs that are to be recorded or printed, in a processor and which are placed into a moveable tray for the processing. The existing processors, namely printers and recorders have internal programs which control slidable trays that will move to a loading position outside of the housing for the processing operation, receive the disc and then retract into the housing for performing the processing operation: printing, duplicating, recording or the like. Generally, a blank CD supply or input bin has a stack of discs positioned at one location, with the tray being in a center position, and a finished disc storage bin is on an opposite side of the tray from the input bin.

The robotic arm in the present invention, carries a known "picker" for lifting a single disc. A sensor on the arm or picker senses when a disc is properly positioned on the picker mechanism, relative to the arm. This positional signal is then used by a controller to provide feedback for the error conditions previously described. The feedback of the error conditions can then be used to initiate procedures to fix the condition before damage to the equipment can occur. The controller is programmed to perform a series of sequential programmed operations for picking and placing and operating the processor.

In normal operation, the sensor determines when the picker is positioned vertically to pick up a disc, and after lifting a disc whether the disc is properly held for movement to the tray. However, in the present invention, the same sensor is used to determine the error conditions previously described. When the sensor is activated as the arm lowers to the stack of discs at the input bin it signals the picker is in position on top of the top disc of the input bin, and the signal is used to determine the height of the stack of the remaining discs (each has a known thickness) to determine whether or not on the previous pass of the robotic arm and picker two or more discs were lifted. Shifting two or more discs at once would cause a discrepancy in the height of the input bin stack that is discernable.

At the start of a cycle the sensor can sense the presence of a disc in the disc tray for the processor. The initial check that the tray has no disc in it eliminates the potential to drop a second disc on top of a disc already in the tray, thereby damaging the tray drive with the mechanical interference caused by two discs or damaging a recorder by spinning up two discs simultaneously. The robotic arm will be moved to a position overlying the tray, and will be lowered, so that it reaches a position where the sensor would normally contact a disc if there was a disc in place. A lack of a signal will be indicate that the tray support is free of a disc and that the processing sequence can start.

The robotic arm is then moved laterally to overlie the input bin, and is lowered to a position where the picker can pick a disc in the bin. The sensor will indicate that a disc is properly positioned on the picker of the robotic arm, and assuming that the stack of discs is the correct height, the picker is actuated to take the top disc, the arm is then lifted and moved laterally to transport the compact disc over to the tray with the sensor continuously indicating that the disc is still properly positioned.

Once the disc is lowered and dropped into the tray, the robotic arm is moved back over to the input bin and lowered down until the sensor senses the upper surface of the top disc (with the picker in the hole in the disc), and the signal is correlated to the vertical position of the robotic arm. If the vertical height of the arm is too low, based on the thickness of the single disc that should have been removed, it means that more than one disc had been removed. An error signal will be delivered to an operator indicating that two discs had been removed on the previous "pick".

A further test that can be carried out is after a disc has been processed in a processor and the tray is moved out to the loading/unloading position. The robotic arm will move down to attempt to pick up the processed or finished disc, but if the tray is not in a proper position because the tray comes out skewed or not fully extended, the picker fingers will not enter the opening in the disc in the tray and the sensor will indicate that the disc is not present when the arm is lifted, again with the arm position detected by the controller. A signal is provided indicating that the picker is unable to lift the disc on the tray. This signal can be used to retract the tray into the processor and re-extend it, providing a "second try" at disc removal. Two or three attempts at picking up a processed disc can be carried out and then a suitable signal will be generated indicating malfunction.

The controllers used for operating the processors and the robotic arm are known, and the additional signal indicating disc presence on the picker is programmed as part of the sequence.

BRIEF DESCRIPTION OF THE DRAWINGS

FIG. 1 is a perspective view of a typical processor assembly comprising a printer and a duplicator combination shown with the duplicator tray in its loading position with a robotic arm overlying the tray to check for presence of a disc;

FIG. 2 is a view similar to FIG. 1 with the robotic arm over an input or blank disc bin;

FIG. 3 is a view similar to FIG. 1 but the robotic arm moved to overlie the processor tray for the processing station and in position to load a blank disc moved from the input bin onto the tray;

FIG. 4 is a view showing the robotic arm moved back to overlie the input bin of the stack of discs and to provide a signal to insure only one disc had been removed previously;

FIG. 5 is a fragmentary front elevational view of the processor showing an input bin with the robotic arm and picker in position to check for the correct height of the stack of discs in the input bin;

FIG. 6 is an enlarged fragmentary sectional view of the robotic arm and picker fingers in position for checking the height of the stack of discs;

DETAILED DESCRIPTION OF THE PREFERRED EMBODIMENTS

Figure 7:
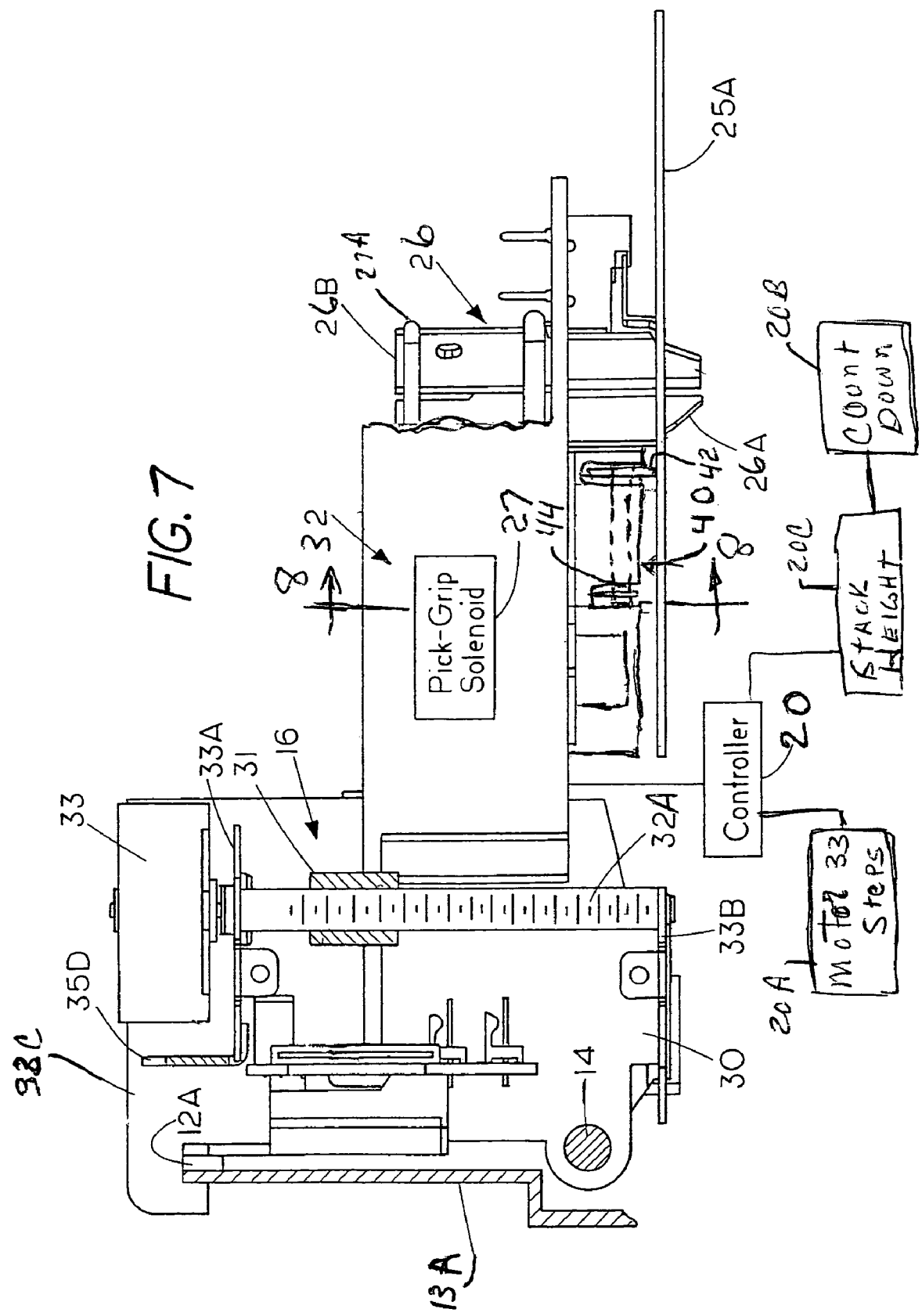
FIG. 7 is a fragmentary side elevational view of a robotic arm holding a disc in position and illustrating the picker fingers for holding the disc.

A disc processor 10 comprises a combined CD recorder or burner and printer and is of same form as that shown in U.S. patent application Ser. No. 10/447,503. The apparatus has an outer housing 12, and has a printer frame 13 on the interior of the housing. The printer frame is a conventional LEXMARK inkjet printer, made and sold by Lexmark International, Inc. of Lexington Ky., USA, and it provides for a support for a cross shaft 14 that mounts a printhead assembly 16. As shown, the printhead assembly includes guides that permit the printheads to move along the shaft or support rod 14 in a normal manner, and this is driven with a drive belt shown schematically at 18, back and forth along the shaft 14 so that the printhead moves to different locations and can be used for printing on a disc in the printer support tray which is shown retracted at 17 in FIG. 2. The tray 22 that is shown extended to a loading position is on a duplicator or recorder. The printer is stacked above the duplicator in the housing 12.

The duplicator and printer are operated in a normal manner, using a digital controller 20 including memory so the movements and operations of the processing stations can be synchronized with the other operations. The duplicator tray 22 is moveable in and out of the duplicator housing shown schematically at 24, and is synchronized with the controller 20 to carry out the processing operations on compact discs that are shown generally at 25 in the figures.

In order to move the discs back and forth between the processing station trays 22 and 17, a disc gripper or picker 26 made of three fingers 26A, 26B, and 26C forms part of a disc transport mechanism 30 including a robotic arm 32 that is coupled to the printhead 16, so that it is moved along the shaft 14 with the printheads when releasably latched in place. In this way the arm 32 can be moved laterally along the shaft 14 to different positions. For example, the arm 32 can be moved to overlie the tray 22, (and tray 17 when printing) as shown in FIGS. 1 and 3, and to overlie disc input storage bin at 34 as shown in FIG. 2 that is positioned to one lateral side of the tray 22.

The disc picker, as can be seen perhaps best in FIG. 7, 8 & 9 comprises a head that has picker fingers 26A, 26B and 26C. Finger 26A is retracted in a normal manner with a solenoid 27, so that when it is retracted under control from a signal from the controller 20 it can be inserted into an opening 38 in a disc, for example, as shown in FIG. 1. The finger expands under a spring load from surrounding springs 27A that pivot the lower ends of the fingers outwardly to engage a hole in a disc.

The robotic arm 32 also is controlled for moving the picker head vertically, by driving a threaded shaft 32A supported on horizontal flanges 33A and 33B, and which is rotated by a stepper motor 33 (or other reversible motor the portions of which can be encoded) controlled by a controller 20. Thus the robotic arm 32 can be raised to clear the holders forming the bin 34, and the stack of discs 25 in the bin. The base for the transport mechanism 30 is supported on shaft 14 and an upper on an upright flange 13A of the frame 13.

Figure 9:
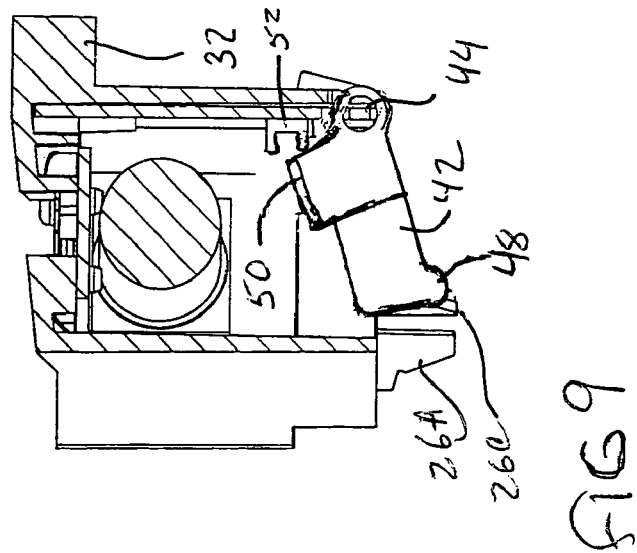
FIG. 9 is a view similar to one taken along the same line as FIG. 8 showing the position of a sensor with no disc being held in the picker fingers.
Figure 8:
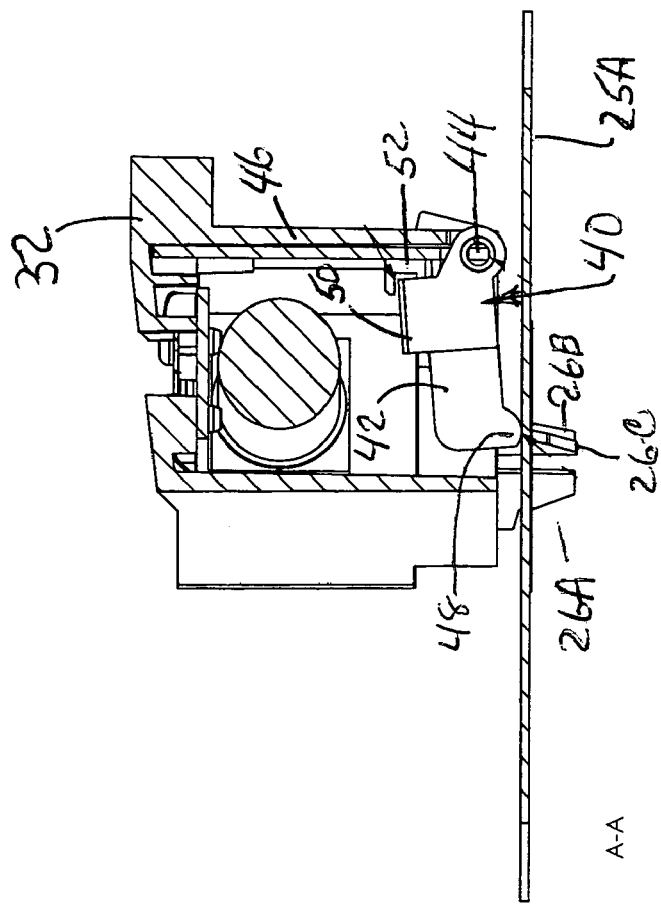
FIG. 8 is a sectional view taken in line 8-8 in FIG. 7 showing a sensor lever that pivots, and detects the presence of a disc on the picker fingers.

The robotic arm 32 is provided with a sensor assembly shown generally at 40. As shown in FIGS. 7, 8 & 9, it is a pivoting lever 42 that is mounted on a shaft 44 pivotally mounted onto a column 46 of the arm, and wherein the pivoting lever 42 has a rounded sensing end 48 that will engage a disc shown at 25A in FIGS. 7 & 8, to indicate that the disc is being held by the picker fingers 26A, 26B, and 26C. The pivoting lever 42 has a flag 50 that enters a space between a light source and receiver of an optical sensor 52. When the lever 42 is lifted as shown at FIG. 8, the flag 50 interrupts the light beam from the light source of the optical sensor 52 to the receiver, and the sensor 52 provides a signal indicating that a disc is positioned on the fingers 26A-26C of the robotic arm. This lever 42 is a position sensor that senses when a surface is at a particular level relative to the arm 32.

The arm is lifted by stepper motor 33 driving the shaft 32A that lifts the arm 32. The motor 33 is supported on the mounting bracket 32C that holds the arm 32 in place. This bracket 32C guides on the frame upright 13A, and also receives the sliding shaft 14 for movement transversely along the shaft.

The drive screw 32A mounts a threadable and moveable hub 31 that supports the arm for moving along the screw 32A. The position of the arm 32 in vertical direction is known by recording the steps or rotations of the stepper motor 33.

Once the disc 25A that has been lifted clears the support for the bin 34, the arm 32 is moved along the shaft 14 by driving the printhead 16, to a position overlying the tray 22, and in particular overlying the recess 23 for the disc. The arm 32 is then lowered and the disc is put into place, by releasing the picker finger 26A. Then, in the next step, the arm 32 is again moved to overlie the stack of discs 25 in the bin 34 and is lowered down by driving the stepper motor 33 until the sensor lever 42 contacts the top disc 25 remaining in the input bin 34. When a signal indicates the arm position, the sensor signal is provided to the controller 20 and the controller compares the position of the arm 32 along the screw 32A and determined by the count of steps of the stepper motor 33 so that the height of the stack of discs 25 can be determined. The motor steps are indicated at 20A in FIG. 7, and the countdown for the discs lifted by the arm and dropped in the processor tray is indicated at 20B. The start stack height is an input 20C. The number of discs that should be remaining in the stack is also recorded in memory in the controller, and if the height of the stack does not equal the correct height for the number of disc that should be remaining in the stack, an error signal is generated indicating that two (or more) discs have been picked up and deposited in the tray 22. The unit can be shut down or merely paused until an operator corrects the error and inputs sufficient information so that the operation of either recording or printing can resume.

The processing of the disc can take place, again which can be any desired operation after the tray is retracted, including duplicating or printing using the printheads. If printing takes place, the printheads 16 would be released from the transport 30 and moved independently of the arm 32. The robotic arm is stored above the finished disc bin 60 during printing, as explained in U.S. patent application Ser. No. 10/447,503, filed May 29, 2003, which is incorporated by reference. The printing heads 16 then can move to complete the printing, and after printer re-latched to the arm 32. If the disc is being duplicated or burned-in by a duplicating processing unit, the arm 32 can remain with the printheads 16.

Once the process on the disc has been completed, the tray 22 is extended and the finished disc would be exposed as shown in FIG. 4, for example. The arm 32 would be moved or cycled down to the position to pick up that disc, and cycled up to lift the disc and then transport the disc over to the storage bin 60 and drop it into place.

If the disc is not capable of being picked up, for example if the tray has become misaligned, as previously explained, the sensor 40 would be used to sense that the disc was not present and remained on the tray or was dropped during the up portion of the processed disc lift cycle. With no disc the lever 42 would drop to the position of FIG. 9 with the flag 50 clearing the light beam of the sensor 52. The "no disc" signal first can be used to retract the tray 22, again by the internal mechanism of the processing station, and then to extend the tray for a further attempt at lifting the disc. The robotic arm 22 would be raised during this operation of retracting the tray and then re-extending it, after which the arm would be lowered (moved down) in an attempt to pick up the disc and cycled up again. Moving the tray one or two times, with no success in lifting the disc would result in an error signal being generated and the processing stopped.

Assuming that the disc has been processed and dropped into the storage bin 60, the robotic arm 32 would be moved along the shaft 14 and, if desired, or programmed, can stop at a position overlying the empty tray 22, lowered to make sure that no disc remains in that tray, by moving the robotic arm down a distance that is known to be sufficient so that the picker fingers would be positioned in the opening in the disc on the tray. If the lever 42 senses a disc in the tray, then it is known that there has been an error, and either the disc would be removed with the arm or the error signal would shut down the processing until the error had been corrected.

Once it is assured that the tray 22 is empty, the arm 32 would be moved over to the input bin, the top disc 25, which is represented at 25A, would be lifted and returned to its position overlying the tray after which the arm would be lowered and the disc placed into the receptacle 23 for the disc on tray 22. Processing would continue.

Figure 10:
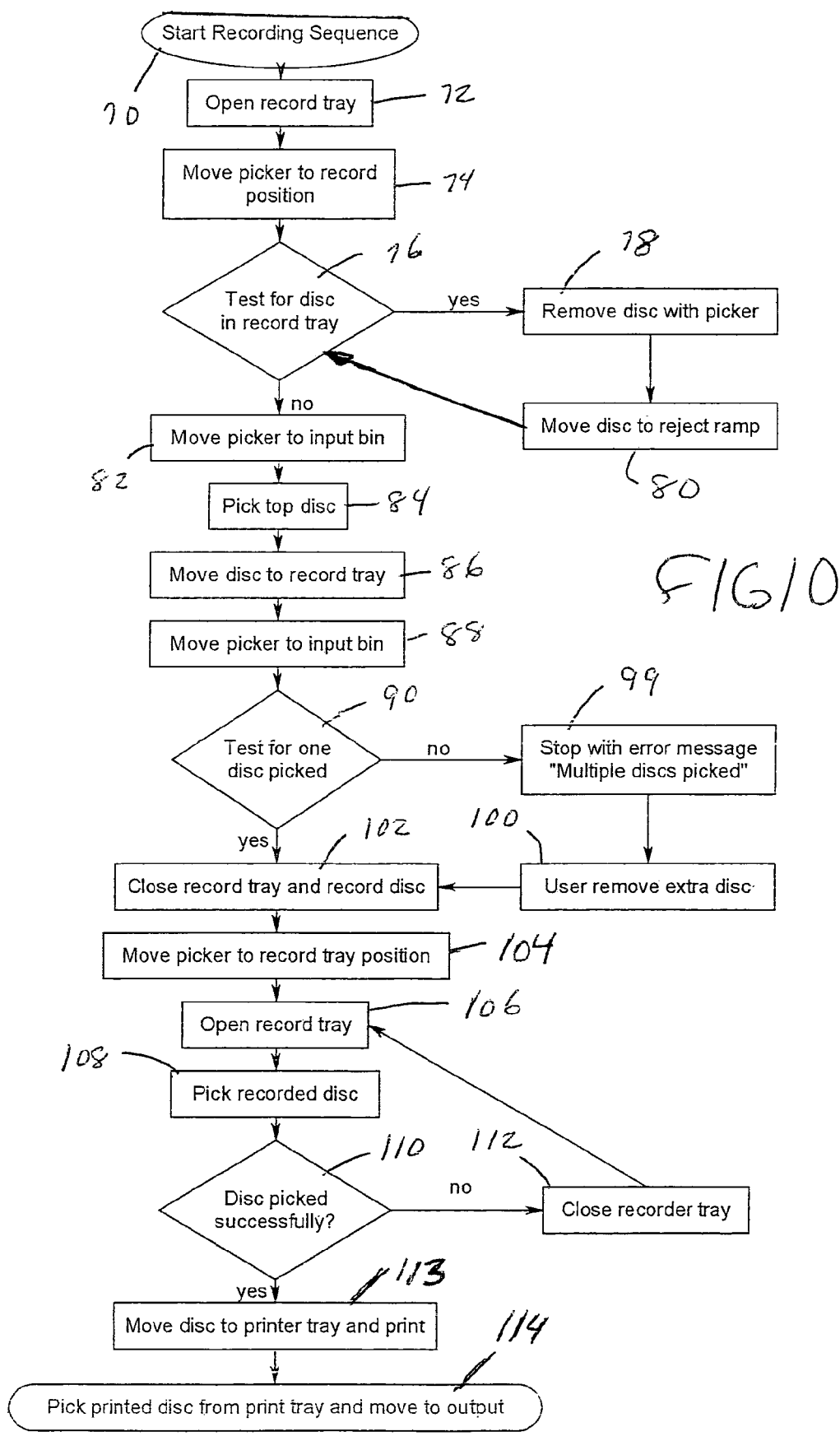
FIG. 10 is a schematic flow diagram illustrating the software-controlled steps used for providing the tests carried out by the system of the present invention.

In FIG. 10, the processing sequences are illustrated in block flow diagram form, and the steps utilize the apparatus previously explained as well as suitable software. The controller 20 is provided with a suitable programs for recording and printing, and the description in FIG. 10 details processing during a recording or duplicating step utilizing a disc duplicator or recorder that has a moveable tray 22 operated by the processors internal drives.

An operator will start the recording sequence by initializing the controller as indicated by step 70, and the tray 22 will then be opened to its loading position as indicated by step 72. The picker 26, carried by the arm 22 will be moved to overlie the tray 20, which is the loading position, as indicated by step 74. The arm 22 will be lowered, and the sensor 42 will test to see if there is a disc in the tray 22. This is indicated at step 76. It should be noted that in FIG. 10 the tray 22 is called a "record" tray as it is dealing with the recording process.

If there is a disc in the tray, the sensor lever 42 will engage the disc and a "yes" answer is obtained from the signal from sensor 42, the disc is removed with the picker 26 by lowering the arm 32 and operating the picker solenoid 27 to pick the disc out of the tray 22, as indicated by step 78. That disc is then moved to a reject ramp. In the apparatus shown, if the disc is to be rejected, the tray is retracted and the disc is dropped onto a slide or reject ramp 62 shown in FIG. 2 and other figures. This is indicated at step 80.

Once the test 76 has been performed, if there is a sense that there is no disc in the record tray, or if the disc has been moved to the reject ramp at step 80, the next step in the process is to move the picker to overlie the input bin shown at step 82. The arm 22 and the picker 26 to overlie the stack of discs 25 in the bin.

As shown in step 84, the top disc 25A will be picked from the input stack, and will be moved to overlie the tray 22, which has been extended to its loading position. This is indicated by the step 86. The disc will be lowered down onto the tray, and dropped into position in the recess 23 for the disc.

As indicated by the step 88, the picker arm will again be lifted and moved to overlie the input bin 34 and then a test for determining whether only one disc or more than one disc has been picked up by the picker arm is performed as indicated by the step 90. This is done by lowering the arm 32, and putting the picker into position in the disc openings so that the lever will sense the top disc in the stack 25 and will provide a signal which is correlated to the vertical position of the picker arm 32 by the controller. A comparison is made to determine whether or not the stack of discs is the right height, or if an extra disc has been picked. This is, again, done by knowing and recording in memory the thickness of each disc and a processed count of the number of discs that should have been removed. If the controller senses that the stack is too low, a no answer is delivered in the logic, and as indicated by the step 92 an error message is generated, and the process is stopped.

If the process has stopped, and the incorrect number of discs has been placed in the tray, the user or operator will remove the extra disc as indicated by the step 100. After that, the process can continue and the record tray will close and recording on the disc will take place. In the case of the processor comprising a printer, the printer tray closes and printing on the disc would be at the step 102. If the test at block 90 shows that only one disc had been picked the yes indication moves the process directly to step 102.

While the processing on the disc is being undertaken, tray 22 will have been retracted, and the picker arm and picker can be moved to position to overlie the tray loading position as indicated by the step 104. Once the processing is completed, either recording or printing, the tray is opened to the loading position by the controller operating through the internal processing station mechanisms, as indicated by the step 106. The arm 22 is operated in a cycle having a down portion when the arm is lowered to pick up the recorded disc as indicated by step 108, and an up portion of the cycle to lift the processed disc.

The signal provided by the sensor lever 42 will ensure that a disc remains in place in the picker during the up portion of the cycle of the arm. The lever 42 is raised as shown in FIG. 7 when a disc is held. This check is indicated by the step 110. If the lever 42 indicates no disc is being carried by the picker arm, the recorder tray will be closed as indicated by step 112 and re-opened for another try in case the tray position has been a problem in picking up the recorded disc. Step 106 is repeated by opening the tray 22, then making another attempt to pick a disc by repeating the down and up cycle as explained and as indicated by step 108. The test would be repeated as indicated by step 110.

Again if no disc is present, the step 112 would be repeated by closing the tray once again to try to ensure proper alignment. The tray would be opened again and a pick attempt would be made. After this has been done two or more times, or, in another words, if the "disc picked successfully" test has a no answer for perhaps two times or more, as selected by an operator, an error signal will be generated.

If test 110 indicates that a disc has been picked up successfully then the disc is moved to a desired location, and in this sequence, as explained in application Ser. No. 10/447,503, the disc can be moved to an overlying printer tray and printed as indicated by step 112, or it can then be moved directly to an output of desired location. After the disc has been printed, the processing is completed and the tray and the disc will be moved to output storage bin 60 as indicated by step 114.

The process is described showing the recording tray 22 being the tray that is used for the processing, and it is to be noted that the printing would take place subsequent to the recording with the printer tray being extendable to a position that would be overlying but aligned with the position of the tray 22 so that the picker arm 32 and the picker 26 will be aligned with a disc stored in the printer tray as well. This sensing system can be used with a printer only, or with a recorder only, or with the combination that is shown schematically in this application.

The system thus, by having a disc sensor mounted to determine the presence or absence of a disc on the disc picker or support, provides for checking at least three separate tests, and providing error signals when a disc either is at a location where it should not be, or is not at a location where it should be during the process.

Although the present invention has been described with reference to preferred embodiments, workers skilled in the art will recognize that changes may be made in form and detail without departing from the spirit and scope of the invention.

What is claimed is:

1. A disc processing apparatus comprising a support, a picker arm for lifting and transporting discs, the discs having a planar surface, said picker arm being moveable substantially perpendicular to the planar surface of a disc, a picker on the picker arm for picking up a disc for transport, and a sensor carried by the picker arm for sensing the presence of a disc with the planar surface of the disc at a known position relative to the picker arm.

2. The apparatus of claim 1, wherein the picker arm is movable substantially perpendicular to the planar surface of a disc held by the picker.

3. The apparatus of claim 1, wherein said picker arm is moveable along an axis perpendicular to the planar surface of a disc supported on the picker, and wherein the sensor comprises a mechanical element that engages a disc in a lifting position of the picker to provide a signal indicating that a surface of a disc is at a known relationship to the picker arm in a direction perpendicular to the planar surface of the disc.

4. The apparatus of claim 3, wherein said mechanical element comprises a pivoting lever, said lever having a portion that initiates a signal when the lever pivots due to the lever moving to engage a planar surface of a disc at the known position relative to the picker arm.

5. The apparatus of claim 1, wherein said sensor has two states, a first state indicating the absence of a planar surface at a known position relative to the picker arm, and a second state when a planar surface is at the known position relative to the picker arm.

6. The apparatus of claim 1, wherein the picker arm is mounted on the processing apparatus for movement substantially parallel to the planar surface of a disc held by the picker.

7. The apparatus of claim 6 including a controller for controlling movement of the picker arm perpendicular to and parallel to the planar surface of a disc held by the picker.

8. The apparatus of claim 7, wherein the movement of the picker arm perpendicular to the planar surface of a disc held by the picker is sensed by the controller.

9. An apparatus for processing discs including a frame, an input bin for storing a plurality of discs in a stack centered along a central axis perpendicular to the discs, a picker arm for removing discs from the stack including a disc picker, said picker arm being moveable in a direction substantially parallel to the central axis, the picker arm overlying a portion of a top disc in the stack when the disc picker is in position to lift a top disc, a sensor on the picker arm to sense the presence of a top disc on the disc picker with the top disc in position to be lifted by the disc picker and provide a signal when a top disc is present, and a controller receiving the signal indicating a top disc is present and providing control signals for controlling the apparatus based upon the signal at selected positions of the picker arm.

10. The apparatus of claim 9, wherein the controller includes means to determine whether a proper number of discs are in the stack when the picker is in position to lift the top disc of the stack.

11. The apparatus of claim 9 including a drive for moving the picker arm laterally relative to the axis of the stack, and for positioning the picker arm over a disc support tray for processing.

12. The apparatus of claim 11 wherein the apparatus has a disc support tray moveable to a loading position, and the picker arm being moveable downwardly toward the disc support tray, the sensor being engageable with a disc in the tray to provide the signal when such disc is present in the tray.

13. A compact disc processor including a processing station, and including a disc support tray moveable between a disc loading position and the processing station, a compact disc handler mounted on the processor, said handler having a picker for picking a disc from a storage bin, the handler being moveable from a position overlying the storage bin to a position overlying the tray, and a sensor carried by the handler for sensing when the picker is holding a disc in position for movement between the storage bin and the tray.

14. The processor of claim 13 wherein a controller receives information indicating the position of the handler relative to a height of a stack of discs in the bin, and wherein the sensor provides a signal to the controller when the handler is adjacent to the stack indicating the height of the stack when a top disc in the stack is sensed, the controller correlating the height indicated by the signal to an expected stack height.

15. A method of determining the number of discs that have been removed from a stack of discs by a robotic handler after the handler has removed at least one disc from the stack and deposited the at least one disc in a remote location, comprising moving the handler to overlie the stack, sensing a spacing between the handler and a top remaining disc in the stack, and comparing the position of the handler when it is at the sensed spacing from the top remaining disc in the stack with a reference indicating the correct height of the stack after a single disc was previously removed and moved by the handler to the remote location, to determine whether more than one disc was previously removed.

16. The method of claim 15 wherein said sensor comprises a mechanical sensor that senses a surface of the top remaining disc in the stack that is capable of being supported on the handler.

17. A method of error checking for a compact disc processor having an extendable and retractable disc support tray moveable from a disc loading position to a processing station, an input disc storage bin for supporting a stack of a plurality of discs centered on an axis, and a handler comprising a picker moveable parallel to the axis and laterally to the axis to lift and move a disc from the stack to the tray when the tray is in a loading position, comprising the steps of depositing a disc in the tray with the handler, moving the handler back to overlie the stack and moving the handler to a position to sense the height of the stack, by sensing the spacing between the handler and a top disc in the stack, and determining if the height of the stack is correct for previous removal of a single disc.

18. The method of claim 17 wherein prior to moving the handler to lift and move a disc from the stack, the handler is moved to overlie the tray in the loading position, and moving the handler toward the tray to sense whether there is a disc in the tray.

19. The method of claim 17 wherein a disc is processed and the tray is moved to the loading position with the processed disc, moving the handler in a cycle having a down portion and an up portion to pick up the processed disc, sensing whether a processed disc is supported by the handler in the up portion of the cycle, and moving the tray to the processing station and back to the loading station if no disc is supported in the up portion of the cycle.

* * * * *